United States Patent
Song et al.

(10) Patent No.: US 8,005,478 B2
(45) Date of Patent: Aug. 23, 2011

(54) HANDOVER REQUEST METHOD FOR USE IN PORTABLE INTERNET SYSTEM AND MOBILE COMMUNICATION TERMINAL USING THE SAME

(75) Inventors: Ki Taek Song, Seoul (KR); Sung Hun Hong, Seoul (KR); Seong Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 11/716,560

(22) Filed: Mar. 12, 2007

(65) Prior Publication Data

US 2008/0089291 A1    Apr. 17, 2008

(30) Foreign Application Priority Data

Oct. 12, 2006    (KR) .................. 10-2006-0099411

(51) Int. Cl.
*H04W 36/00*    (2009.01)
(52) U.S. Cl. ...................... 455/436; 370/331
(58) Field of Classification Search .......... 370/331–353; 455/436–444
See application file for complete search history.

(56) References Cited

U.S. PATENT DOCUMENTS

| | | | |
|---|---|---|---|
| 2001/0021650 A1* | 9/2001 | Bilgic | 455/418 |
| 2004/0102194 A1* | 5/2004 | Naghian et al. | 455/436 |
| 2005/0181794 A1* | 8/2005 | Rajkotia | 455/436 |
| 2006/0146753 A1* | 7/2006 | Park et al. | 370/331 |
| 2007/0015510 A1* | 1/2007 | Xiang | 455/436 |
| 2007/0032255 A1 | 2/2007 | Koo et al. | |
| 2007/0293225 A1* | 12/2007 | Kangude et al. | 455/436 |

FOREIGN PATENT DOCUMENTS

| | | |
|---|---|---|
| KR | 10-2006-0009289 A | 1/2006 |
| KR | 10-2006-0024804 A | 3/2006 |
| WO | WO 2004/114691 A1 | 12/2004 |

* cited by examiner

*Primary Examiner* — Jean Gelin
*Assistant Examiner* — Michael Nguyen
(74) *Attorney, Agent, or Firm* — Birch, Stewart, Kolasch & Birch, LLP

(57) ABSTRACT

A handover request method for use in a portable Internet system and a mobile communication terminal using the same are disclosed. The handover request method of the mobile communication terminal in the portable Internet system according to an embodiment includes operating, by the mobile communication terminal, a timer when a handover request of the mobile communication terminal is rejected by a base station; collecting information of at least one neighbor base station during the operation of the timer; and selectively re-attempting the handover request to the base station using the collected information.

14 Claims, 6 Drawing Sheets

HANDOVER REQUEST METHOD FOR USE IN PORTABLE INTERNET SYSTEM AND MOBILE COMMUNICATION TERMINAL USING THE SAME

This application claims the priority benefit of Korean Patent Application No. 10-2006-0099411, filed on Oct. 12, 2006, which is hereby incorporated by reference as if fully set forth herein.

BACKGROUND OF THE INVENTION

1. Field of the Invention

The present invention relates to a portable Internet system or mobile Internet system, and more particularly to a method for allowing a mobile communication terminal to stably and effectively re-transmit a handover request message to a base station when the base station has rejected the handover request message of the mobile communication terminal. The present invention also relates to a mobile communication terminal using this method.

2. Discussion of the Related Art

A portable Internet is indicative of the next-generation communication scheme capable of further assigning the mobility to a local-area data communication scheme designed to use a fixed access point in the same manner as in a conventional wireless LAN. In association with the above-mentioned portable Internet, a plurality of standards are being rapidly proposed and introduced to the market. There are a variety of International standards associated with the portable Internet, for example, the IEEE 802.16 standard, and the IEEE 802.20 standard, etc. A portable Internet system will hereinafter be described with reference to the IEEE 802.16 standard.

Figure 1:
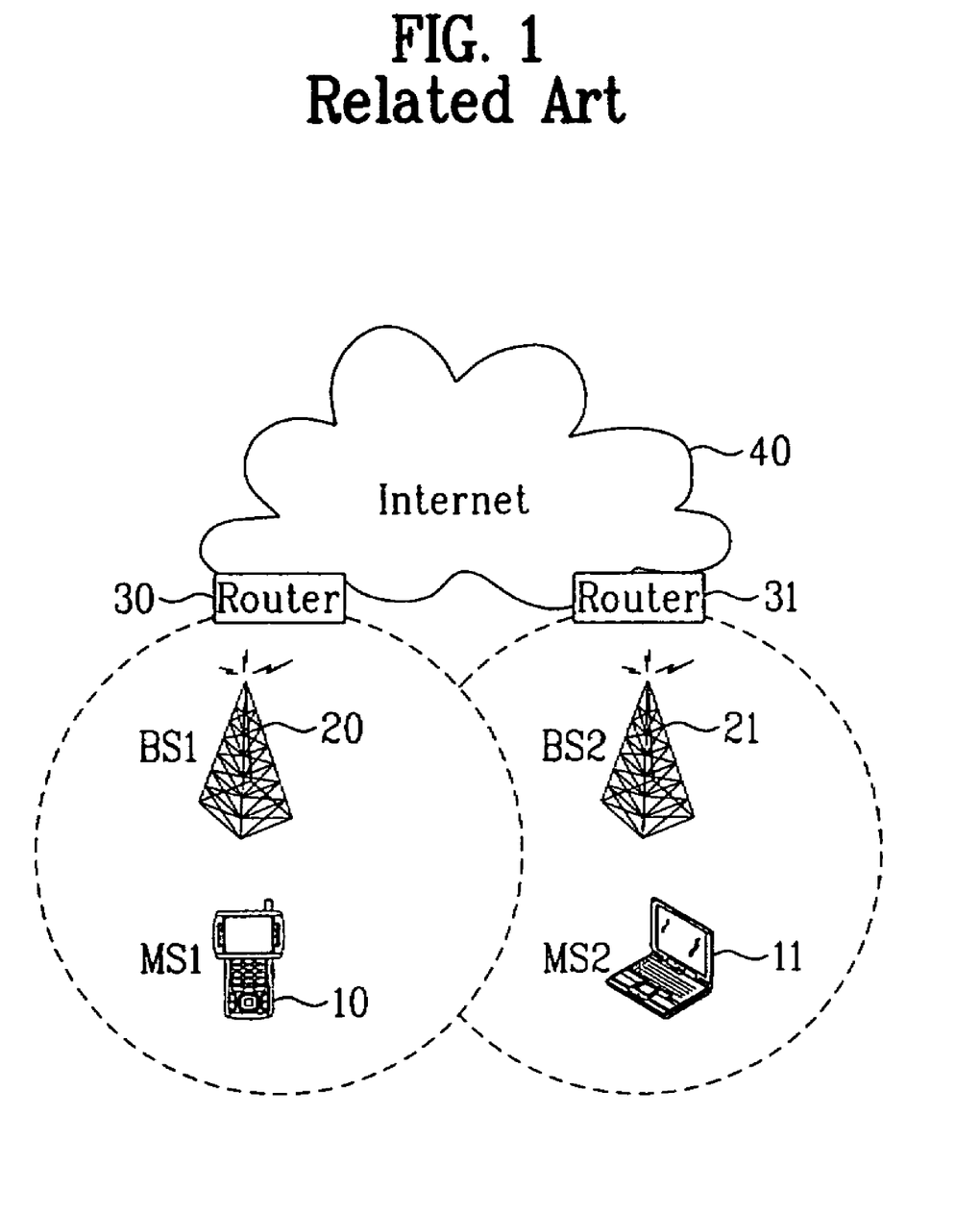
FIG. 1 is a conceptual diagram illustrating a portable Internet system according to a related art.

FIG. 1 is a conceptual diagram illustrating a portable Internet system according to a related art. Referring to FIG. 1, the portable Internet system includes mobile communication terminals (also called mobile stations) 10 and 11, base stations 20 and 21 for wirelessly communicating with the mobile communication terminals 10 and 11, routers 30 and 31 for accessing the base stations 20 and 21 via a gateway, and the Internet 40.

The portable Internet system proposed by the IEEE 802.16 group and other groups guarantees the mobility of the mobile communication terminal 10 although the mobile communication terminal 10 moves from a first cell managed by the base station 20 to a second cell managed by the other base station 21, such that it can provide a user of the mobile communication terminal 10 with a seamless data communication service.

The portable Internet system supports the handover of the mobile communication terminals 10 and 11 in the same manner as in the mobile communication service, and allocates a dynamic IP (Internet Protocol) address as the mobile communication terminals 10 and 11 are in motion.

Figure 2:
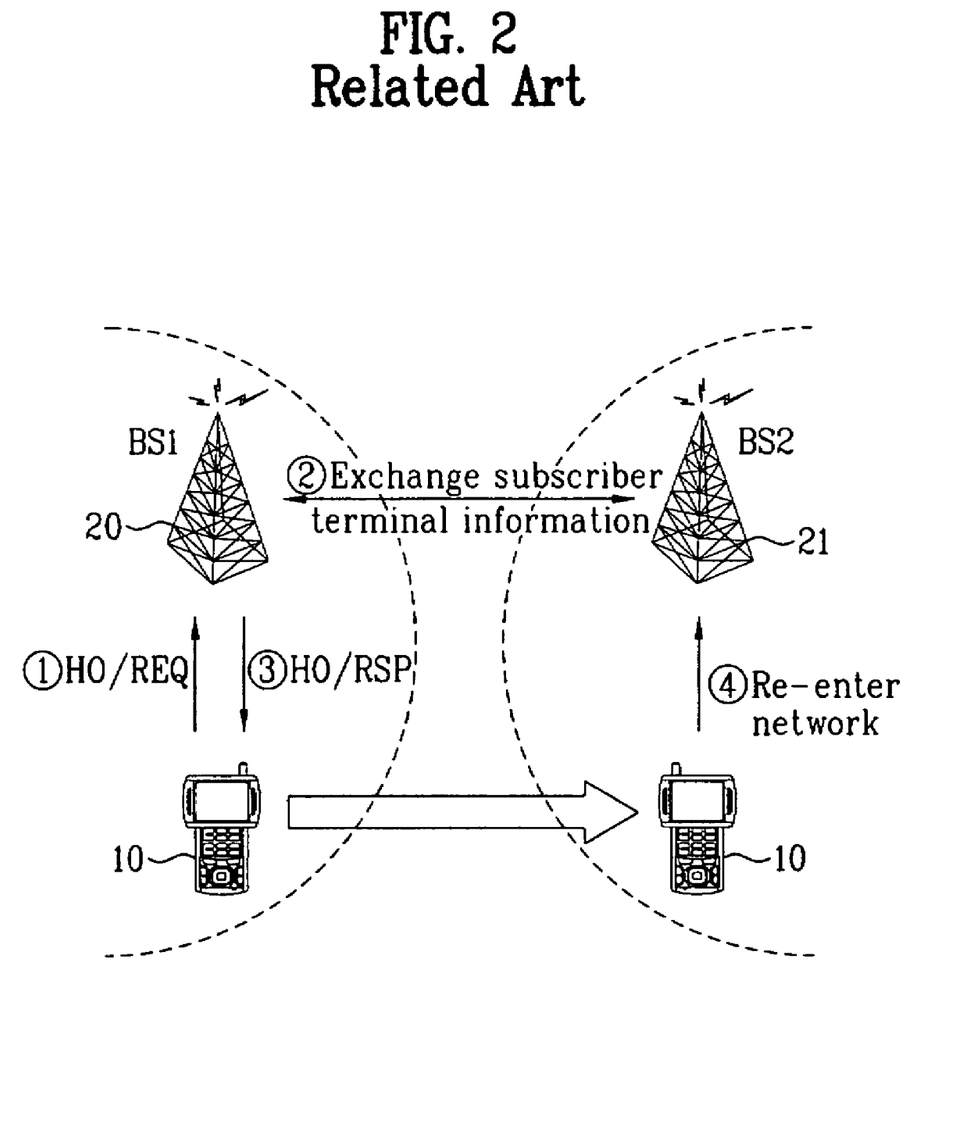
FIG. 2 is a conceptual diagram illustrating a handover process in the portable Internet system of FIG. 1.

FIG. 2 is a conceptual diagram illustrating a handover process for use in the above-mentioned portable Internet system. A handover process for use in the portable Internet system according to a related art will hereinafter be described with reference to FIG. 2.

Referring to FIG. 2, the mobile communication terminal 10 transmits a handover request (Ho/REQ) message acting as a media access control (MAC) message to the base station 20 in order to perform a handover. Upon receiving the handover request message from the mobile communication terminal 10, the base station 20 determines whether neighbor base stations can accommodate the handover request of the mobile communication terminal 10 by exchanging subscriber and/or terminal information, and configures the list of at least one neighbor base station capable of accommodating the handover request in the form of a handover response message, such that it transmits the handover response (HO/RSP) message to the mobile communication terminal 10.

The mobile communication terminal 10 receives the handover response (HO/RSP) message, selects a single neighbor base station (e.g., base station 21) among the recommended neighbor base stations, informs the base station 20 of the selected neighbor base station 21, and attempts to enter the network of the selected neighbor base station 21. In the meantime, the handover can also be performed although the base station 20 firstly transmits the handover request message to the mobile communication terminal 10.

Figure 3:
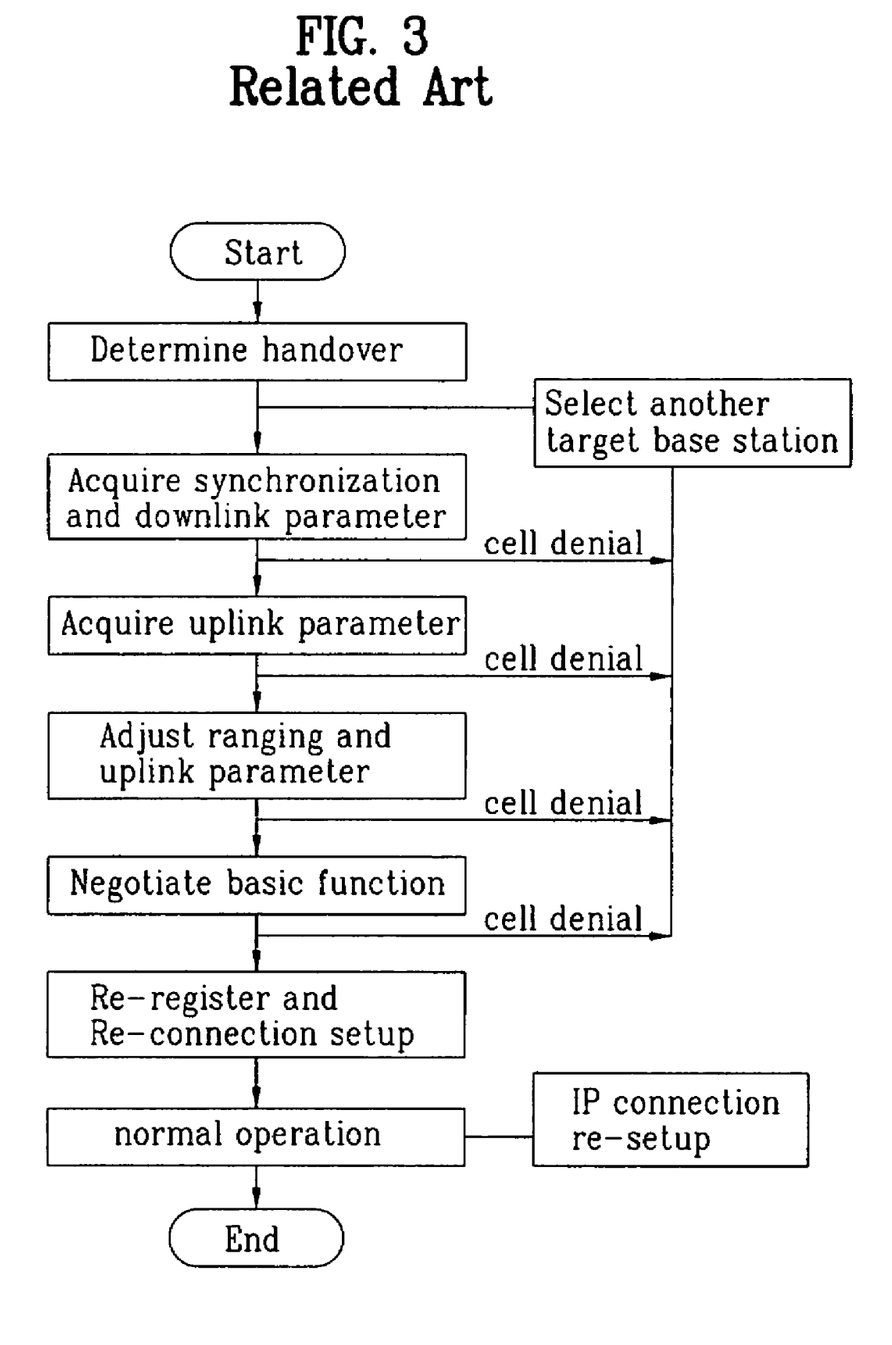
FIG. 3 is a flow chart illustrating a handover procedure of the portable Internet system of FIG. 1.

FIG. 3 is a flow chart illustrating a handover request procedure of the portable Internet system according to a related art.

Referring to FIG. 3, the mobile communication terminal 10 performs quickly a handover from a current base station (e.g., base station 20) to another base station (e.g., base station 21) via a simplified procedure easier than the initial network access procedure.

As shown in FIG. 3, a handover requested by the mobile communication terminal may be rejected by the base station currently communicating with the mobile communication terminal for various reasons. In this case, the mobile communication terminal requires a specific procedure capable of stably communicating with the portable Internet system. However, the specific procedure is not defined in the portable Internet standard according to the related art.

BRIEF SUMMARY OF THE INVENTION

Accordingly, the present invention is directed to a handover request method for use in a portable Internet system and a mobile communication terminal using the same that substantially obviate one or more problems due to limitations and disadvantages of the related art.

An object of the present invention is to provide a method for allowing a mobile communication terminal to stably and effectively re-attempt a handover request message to a base station when the base station has rejected the handover request of the mobile communication terminal, and the mobile communication terminal using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a handover request method of a mobile communication terminal in a portable Internet system according to an embodiment of the present invention comprises: operating, by the mobile communication terminal, a timer when a handover request of the mobile communication terminal is rejected by a base station; collecting information of at least one neighbor base station during the operation of the timer; and selectively re-attempting the handover request to the base station using the collected information.

Preferably, the method further comprises: determining whether a communication status between the mobile communication terminal and the base station is less than a first reference value during the operation of the timer, wherein the re-transmitting step is executed when the communication status is less than the first reference value.

Preferably, the method further comprises: maintaining communication with the base station when the communication status is equal to or higher than the first reference value and the timer expires.

Preferably, the method further comprises: determining whether the communication status is equal to or higher than a second reference value when the communication status is equal to or higher than the first reference value and the timer expires; maintaining communication with the base station when the communication status is equal to or higher than the second reference value; and re-attempting the handover request to the base station using the collected information when the communication status is less than the second reference value.

In another aspect of the present invention, there is provided a mobile communication terminal for requesting a handover request in a portable Internet system comprising: a transmission/reception module configured to request a handover to a base station and receive information indicating an approval or denial of the handover request from the base station; a controller configured to operate a timer and control to collect information of at least one neighbor base station during the operation of the timer, when the handover request is rejected by the base station; a scanning module configured to collect the information of the neighbor base station during the operation of the timer according to a control signal of the controller; and a network access processor configured to control the transmission/reception module to selectively re-attempt the handover request using the collected information.

According to another aspect of the present invention, there is provided a handover request method of a mobile communication terminal, the method comprising: checking if a first handover request from the mobile communication terminal to a serving base station is denied; checking a communication status between the mobile communication terminal and the serving base station if the first handover request is denied; and transmitting a second handover request to the serving base station or continuously communicating with the serving base station, depending on the checked communication status between the mobile communication terminal and the serving base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that a portable Internet system according to the present invention may be selected from among a variety of portable Internet systems based on the IEEE 802.16 or IEEE 802.20 standard, for example, a WiBRO based on the IEEE 802.16(e) standard, and a Mobile WiMAX based on the IEEE 802.16(e) standard, etc. Besides, it should be noted that the present invention can also be applied to all wireless portable Internet systems capable of providing users with the mobility.

Figure 4:
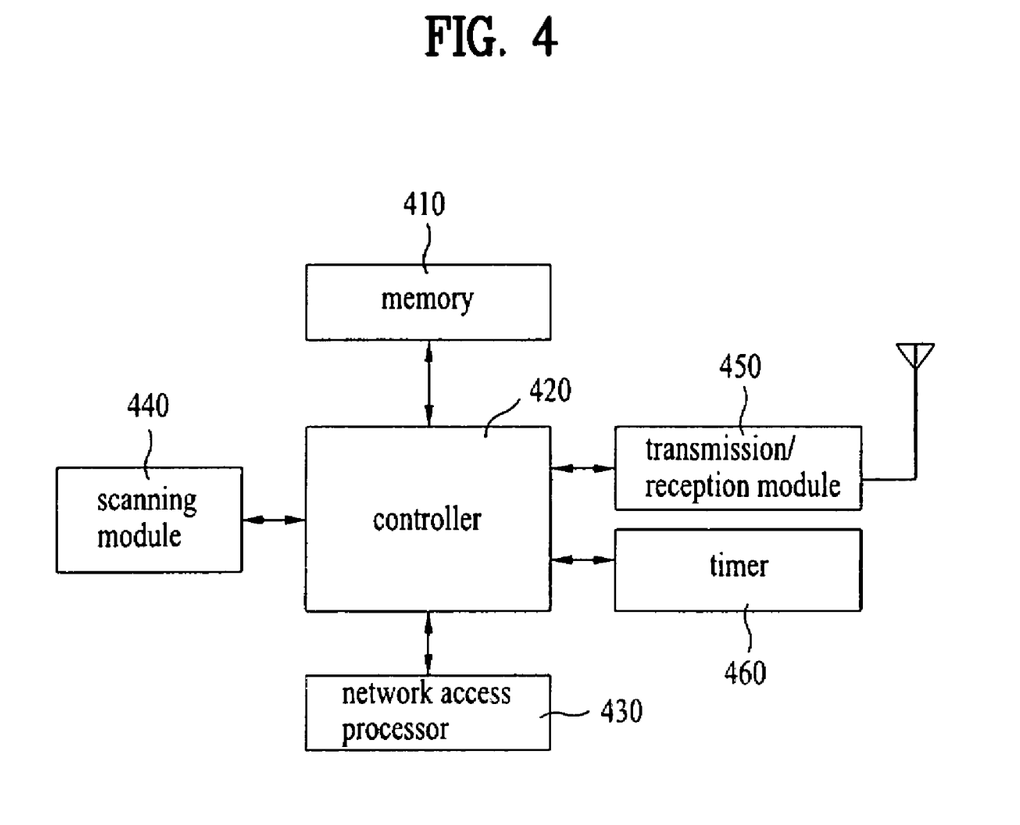
FIG. 4 is a block diagram illustrating a mobile communication terminal for requesting a handover in a portable Internet system according to an example embodiment of the present invention.

FIG. 4 is a block diagram illustrating a mobile communication terminal for requesting a handover in a portable Internet system according to an example embodiment of the present invention.

Referring to FIG. 4, the mobile communication terminal includes: a memory 410 configured to store a variety of information; a controller 420 configured to generate a variety of control signals associated with a handover execution and other operations; a network access processor 430 configured to process a network access according to a control signal received from the controller 420; a scanning module 440 configured to collect information of neighbor base station(s) according to a control signal received from the controller 420; and a transmission/reception module 450 configured to transmit/receive data to/from a base station according to a control signal received from the controller 420. The mobile communication terminal can include additional components that are known, e.g., a display unit, an input unit, etc. All the components of the mobile communication terminal are operatively coupled and configured. Specific examples of the mobile communication terminals can include, but are not limited to, cell phones, PDAs, smart phones, laptops, etc.

The memory 410 stores input/output (I/O) data of the mobile communication terminal and programs for operating individual constituent components.

Specifically, the memory 410 stores the neighbor base station's information collected by the scanning module 440. The memory 410 stores data and messages communicated between the transmission/reception module 450 and the base station(s) over the portable Internet or the like.

For example, information of the neighbor base stations indicates the wireless environments of individual neighbor base stations, and indicates power levels or signal strengths of the individual neighbor base stations. Specifically, as an example, the information of the neighbor base stations indicates a Carrier to Interference and Noise Ratio (CINR) or a Received Signal Strength Indication (RSSI) measured at the individual neighbor base stations. In this case, the CINR indicates the ratio of the signal interference to the received signal, such that it indicates the strength of the received signal considering the signal interference component. The RSSI indicates only the received signal strength without considering the signal interference.

The network access processor 430 manages the network access of the mobile communication terminal in the portable Internet system.

Specifically, the network access processor 430 outputs a control signal for performing the handover via a neighbor base station upon receiving a control signal from the controller 420.

The controller 420 controls all the functions and all the operations of the mobile communication terminal. Particularly, the controller 420 controls a variety of operations associated with the portable Internet.

The controller 420 operates a timer 460 on the condition that a handover requested by the transmission/reception module 450 has been rejected. Operating the timer 460 preferably means the timer 460 is activated, turned on, or started so that time (or time period) can be measured. The timer 460 can be part of the controller 420 (or other component), or can be a separate entity.

The transmission/reception module 450 requests the handover to the serving base station using a handover request message, and then receives a handover response message indicating the approval or denial of the handover request from the serving base station. In this case, if the handover response message indicates the denial of the handover request, the controller 420 determines that the handover request has been rejected by the serving base station.

Also, the timer 460 is operated for or during a set period of time according to a control signal of the controller 420.

Operations of the constituent components of the mobile communication terminal during the operation of the timer 460 will hereinafter be described in detail according to an embodiment of the present invention.

The scanning module 440 collects information of neighbor base station(s) during the operation of the timer 460 (e.g., for a predetermined time duration). The information of the neighbor base stations is equal to or similar to that of the above-mentioned case, so that a detailed description thereof will herein be omitted for the convenience of description.

The controller 420 determines whether a communication status between the mobile communication terminal and the serving base station is less than a first reference value during the operation of the timer 460, e.g., during a predetermined time period. In this case, the communication status indicates a power level or signal strength of the serving base station. The first reference value indicates a minimum power level or minimum signal strength required for maintaining communication with the serving base station.

If it is determined that the communication status is less than the first reference value (which implies that, e.g., communication quality with the serving base station is deteriorating or has problems), the network access processor 430 controls the transmission/reception module 450, using the neighbor base stations' information collected by the scanning module 440, to re-attempting the handover request to the serving base station. That is, the network access processor 430 re-transmits the handover request or transmits a second handover request to the serving base station. In this case, the controller 420 may stop the operation of the timer 460. For instance, counting of the time may be stopped.

More particularly, if it is determined that the communication status between the mobile communication terminal and the serving base station is less than the first reference value, the network access processor 430 extracts information of at least one neighbor base station (hereinafter, referred to as a target base station) to which the mobile communication terminal is to perform the handover, from the collected neighbor base station's information.

The transmission/reception module 450 transmits a handover request message including the extracted information by the network access processor 430 to the serving base station, such that it re-requests the handover to the serving base station, so as to switch from the serving base station to the target base station. In this case, the target base station can be selected on the basis of the power level or signal strength of the individual neighbor base stations.

Operations of the above-mentioned constituent components of the mobile communication terminal after the timer 460 expires will hereinafter be described in detail according to an embodiment of the present invention.

If the communication status between the mobile communication terminal and the serving base station is equal to or higher than the first reference value (which means, e.g., communication quality with the serving base station is acceptable or good), the transmission/reception module 450 continuously communicates with the serving base station according to a control signal of the controller 420. Then, once it is determined that the communication status is equal to or higher than the first reference value, the controller 420 determines whether the communication status is equal to or higher than a second reference value.

Then, if it is determined that the communication status is equal to or higher than the second reference value (which means, e.g., communication quality with the serving base station is superior or excellent), the transmission/reception module 450 continuously communicates with the serving base station according to a control signal of the controller 420. Otherwise, if it is determined that the communication status is less than the second reference value, the transmission/reception module 450 re-requests the handover to the serving base station according to a control signal of the network access processor 430.

A handover request method for the portable Internet system according to the present invention will hereinafter be described with reference to FIGS. 5 and 6.

Figure 5:
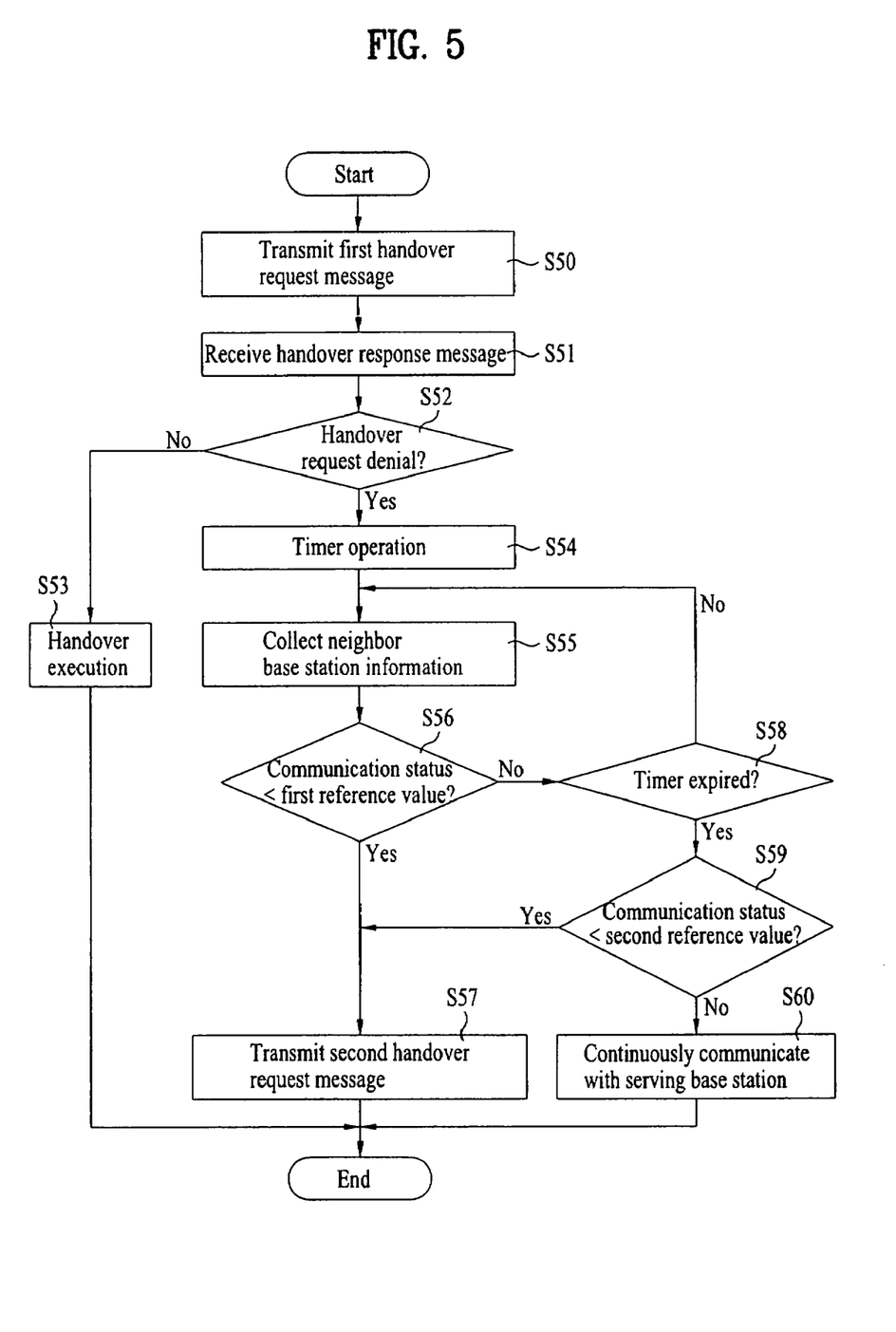
FIG. 5 is a flow chart illustrating a handover request procedure in a portable Internet system according to an example embodiment of the present invention.

FIG. 5 is a flow chart illustrating a handover request procedure in a portable Internet system according to an example embodiment of the present invention. FIG. 6 is a flow chart illustrating messages communicated between the mobile communication terminal and the base station. The messages of FIG. 6 are examples of information communicated between the mobile communication terminal (MS) and the serving base station (BS) in the method of FIG. 5. The method of FIGS. 5 and 6 is implemented by the mobile communication terminal of FIG. 4 (or other suitable device) and a base station in a portable Internet system or other suitable communication system.

For the convenience of description and better understanding of the present invention, the base station communicating with the mobile communication terminal will hereinafter be referred to as a serving base station (BS).

Figure 6:
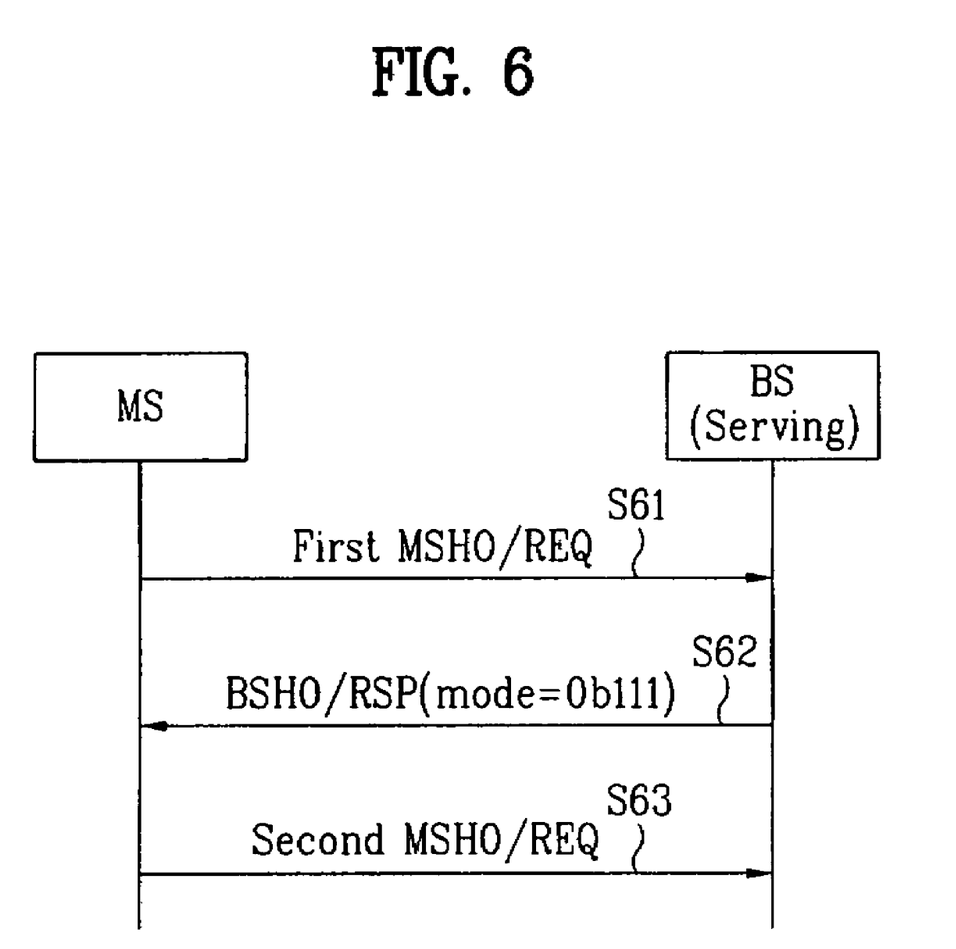
FIG. 6 is a flow chart illustrating examples of messages communicated between a mobile communication terminal and a base station according to an embodiment of the present invention.

Referring to FIGS. 5 and 6, the mobile communication terminal transmits a handover request message (hereinafter, referred to as a first handover request message) to the serving base station at steps S50 and S61. At step S50, the mobile communication terminal transmits the first handover request message to the serving base station according to a conventional handover procedure. In other words, the mobile communication terminal requests the handover to the serving base station using the first handover request message.

In this case, the first handover request message may include information of at least one neighbor base station (hereinafter, referred to as a target base station) to which the mobile communication terminal is to perform the handover. That is, the target base station is a base station that the mobile communication terminal desires to switch over to from the serving base station.

The mobile communication terminal receives a handover response message from the serving base station in response to the first handover request message at steps S51 and S62. In this case, the handover response message includes information indicating the approval or denial of the first handover requested by the first handover request message.

The mobile communication terminal determines whether the received handover response message includes information indicating the denial of the first handover request at step S52. For example, in the received handover response message, if a MODE field from among the MOB_BSHO-RSP message format prescribed in the IEEE P802.16(e)/D12 standard (2005.10.14) is denoted by "0b111", it indicates that the serving base station rejects the handover request of the mobile communication terminal.

The serving base station may reject the handover request of the mobile communication terminal under a variety of situations. For example, if the capacity of the target base station designated by the mobile communication terminal which desires to be handed over is higher than a reference capacity, so that the target base station cannot accept the handover request of the mobile communication terminal (namely, if the target base station cannot communicate with the serving base station), all the base stations cannot accept the handover request of the mobile communication terminal due to the occurrence of overload problems of an overall network.

If the information indicating the denial of the handover request of the mobile communication terminal is not contained in the handover response message at step S52, the mobile communication terminal performs the handover from the serving base station to the target base station at step S53.

On the other hand, if the handover response message includes the specific information indicating the denial of the handover request at step S52, the mobile communication terminal operates the timer (e.g., timer 460) for a period of time at step S54. For instance, the timer 460 is turned on to start counting the time or time length. In this case, the timer may be pre-designed to be operated during the period of time.

The mobile communication terminal scans the neighbor base station during the operation of the timer (e.g., for a predetermined time duration), such that it collects information of at least one neighbor base station at step S55.

The mobile communication terminal determines whether the communication status between the mobile communication terminal and the serving base station is less than the first reference value at step S56. As discussed above, the communication status preferably indicates the power level or signal strength of the serving base station. The first reference value is used as a reference value for determining whether the communication status between the mobile communication terminal and the serving base station is rapidly deteriorated.

If the communication status is less than the first reference value at step S56 ('Yes' at step S56), the mobile communication terminal transmits a second handover request message to the serving base station using the collected neighbor station information and other information at step S57 and S63.

In other words, if it is determined that the communication status is rapidly deteriorated, the mobile communication terminal transmits the second handover request message to the serving base station without waiting for the expiration of the timer, such that it re-requests the handover to the serving base station immediately. In this case, the mobile communication terminal may stop the operation of the timer.

Preferably, the second handover request message may include information of at least one neighbor base station, satisfying a specific reference for selecting a target base station, from among the collected information of the neighbor base stations. The above-mentioned specific reference for selecting the target base station may be determined in various ways. For example, the specific reference for selecting the target base station may be set to the power level or signal strength generated from a corresponding base station. For example, the RSSI (Received Signal Strength Indicator), CINR (Carrier-to-Interference-and-noise ratio), or Relative Delay prescribed in the IEEE P802.16e/D12 standard (2005.10.14) may also be used as the above-mentioned specific reference for selecting the target base station. In this case, the term "Relative Delay" indicates a delay time of a downlink signal of a specific neighbor base station as compared to the serving base station measured by the mobile communication terminal.

At step S56, if it is determined that the communication status is equal to or higher than the first reference value ('No' at step S56), the mobile communication terminal determines whether the timer expires (e.g., whether the predetermine time duration has elapsed) at step S58.

If the timer has not expired at step S58, the mobile communication terminal returns to step S55, such that it continuously collects the information of the neighbor base stations.

In the meantime, if the timer has expired at step S58, the mobile communication terminal determines whether the communication status is less than a second reference value at step S59. Preferably, the second reference value may be equal to or higher than the first reference value.

If the communication status is less than the second reference value at step S59 ('Yes' in step S59), the mobile communication terminal transmits the second handover request message at steps S57 and S63. For instance, if the predetermined time has elapsed and the communication quality with the serving base station is not at a certain desired level, then the mobile communication terminal re-attempts the handover.

In the meantime, if the communication status is equal to or higher than the second reference value at step S59 ('No' in step S59), the mobile communication terminal stops the handover execution/initiation, and continuously communicates with the serving base station at step S60. The communication status equal to or higher than the second reference value indicates a very superior communication status, such that it is preferable for the mobile communication terminal to continuously communicate with the serving base station.

As described above, if the communication status between the mobile communication terminal and the serving base station is not deteriorated enough and does not equal the first reference value or less, the mobile communication terminal waits for the expiration of the timer, so that it cannot perform the handover from the serving base station to another base station immediately.

On the other hand, if the communication status between the mobile communication terminal and the serving base station is deteriorated to reach the first reference value or less, the mobile communication terminal can immediately re-request the handover from the serving base station.

As apparent from the above description, the handover request method for use in the portable Internet system according to the present invention can allow a mobile communication terminal to stably and effectively re-attempt a handover request to a base station when the handover request of the mobile communication terminal has been rejected.

If the handover request of the mobile communication terminal has been rejected by the base station, the mobile communication terminal according to the present invention can re-attempt the handover request or continuously communicate with the serving base station, by referring to the communication status between the mobile communication terminal and the serving base station.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A handover request method of a mobile communication terminal in a portable Internet system, the handover request method comprising:
    transmitting a first handover request message to a base station;
    receiving a handover response message from the base station in response to the handover request message, the handover response message including information indicating an approval or denial of the handover request;
    determining whether the handover request is denied by the base station using the received handover response message;
    operating a timer of the mobile communication terminal for a predetermined time duration if it is determined that the handover request is denied, the predetermined time duration being set by the mobile communication terminal;
    collecting information of at least one neighbor base station while the timer is operating;
    determining whether a communication status between the mobile communication terminal and the base station is less than a first reference value while the timer is operating;
    selectively transmitting a second handover request message for re-attempting the handover request to the base station using the collected information while the timer is operating if it is determined that the communication status is less than the first reference value;
    stopping the timer even if the predetermined time duration does not expire if it is determined that the communication status is less than the first reference value;
    determining whether the predetermined time duration expires, if it is determined that the communication status is not less than the first reference value;
    determining whether the communication status is less than a second reference value, if it is determined that the predetermined time duration expires; and
    maintaining communication with the base station if it is determined that the communication status is not less than the second reference value.

2. The method of claim 1, wherein the step of selectively transmitting a second handover request message includes:
    selecting at least one neighbor base station based on the collected information; and
    transmitting the second handover request message including information of the selected at least one neighbor base station to perform a handover.

3. The method of claim 2, wherein in the selecting step, the mobile communication terminal selects the at least one neighbor base station to perform a handover on the basis of a power level or signal strength.

4. The method of claim 1,
    wherein the communication status is indicative of a power level or signal strength of the base station.

5. The method of claim 1, further comprising:
    maintaining communication with the base station, when the communication status is equal to or higher than the first reference value and the timer expires.

6. The method of claim 1, further comprising:
    re-attempting the handover request to the base station if it is determined that the communication status is less than the second reference value.

7. The method of claim 1, wherein the second reference value is equal to or higher than the first reference value.

8. A mobile communication terminal for requesting a handover in a portable Internet system, the mobile communication terminal comprising:
    a transmission/reception module configured to request a handover to a base station and receive information indicating an approval or denial of the handover request from the base station;
    a controller configured to operate a timer for a predetermined time duration and control to collect information of at least one neighbor base station while the timer is operating, when the handover request is denied by the base station, the predetermined time duration being set by the mobile communication terminal;
    a scanning module configured to collect the information of the neighbor base station while the timer is operating according to a control signal of the controller; and
    a network access processor configured to control the transmission/reception module to selectively re-attempt the handover request using the collected information while the timer is operating,
    wherein the controller is further configured to
        determine whether a communication status between the mobile communication terminal and the base station is less than a first reference value while the timer is operating,
        control the network access processor to selectively re-attempt the handover request to the base station when the communication status is less than the first reference value,
        stop the timer even if the predetermined time duration does not expire when the communication status is less than the first reference value,
        determine whether the predetermined time duration expires, if it is determined that the communication status is not less than the first reference value,
        determine whether the communication status is less than a second reference value, if it is determined that the predetermined time duration expires, and
        control the transmission/reception module to maintain communication with the base station, if it is determined that the communication status is not less than the second reference value.

9. The mobile communication terminal of claim 8, wherein the communication status is indicative of a power level or signal strength of the base station.

10. The mobile communication terminal of claim 8, wherein the network access processor selects at least one neighbor base station to perform the handover based on the information collected by the scanning module when the communication status is less than the first reference value, and the transmission/reception module re-attempts the handover request using the handover request message including information on the selected neighbor base station.

11. The mobile communication terminal of claim 10, wherein the mobile communication terminal selects the at least one neighbor base station to perform the handover based on a power level or signal strength.

12. The mobile communication terminal of claim 8, wherein the transmission/reception module maintains communication with the base station, when the communication status is equal to or higher than the first reference value and the timer expires.

13. The mobile communication terminal of claim 8, wherein the network access processor re-attempts the handover request to the base station when the communication status is less than the second reference value.

14. The mobile communication terminal of claim 8, wherein the second reference value is equal to or higher than the first reference value.

* * * * *